Oct. 31, 1972    G. BIANCHINI    3,701,709
METHOD AND MEANS FOR HEAT BONDING
Filed April 9, 1970    6 Sheets-Sheet 1

INVENTOR
GIACOMO BIANCHINI
BY
ATTORNEYS

Oct. 31, 1972   G. BIANCHINI   3,701,709
METHOD AND MEANS FOR HEAT BONDING
Filed April 9, 1970   6 Sheets-Sheet 4

INVENTOR
GIACOMO BIANCHINI
BY
ATTORNEYS

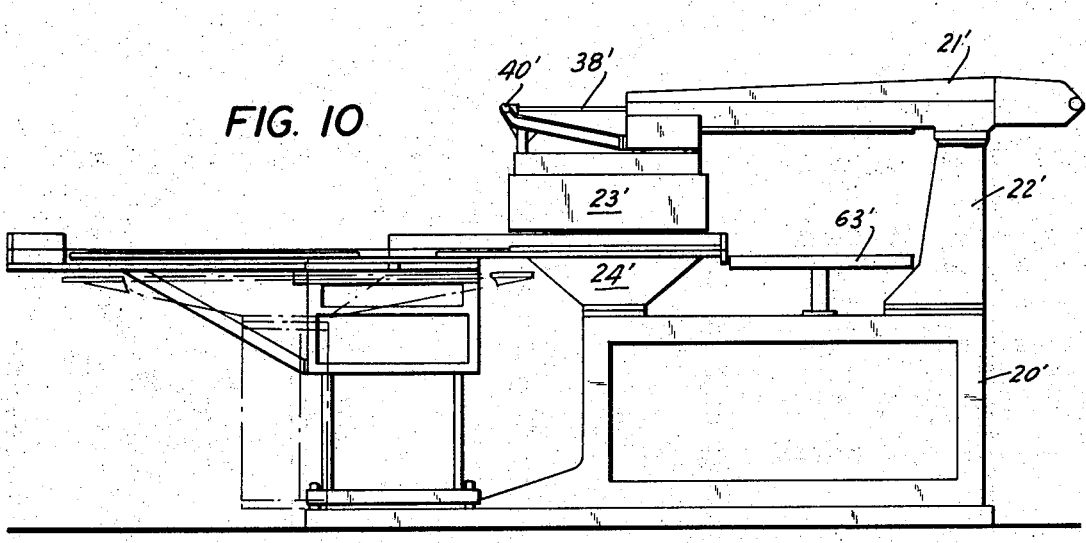
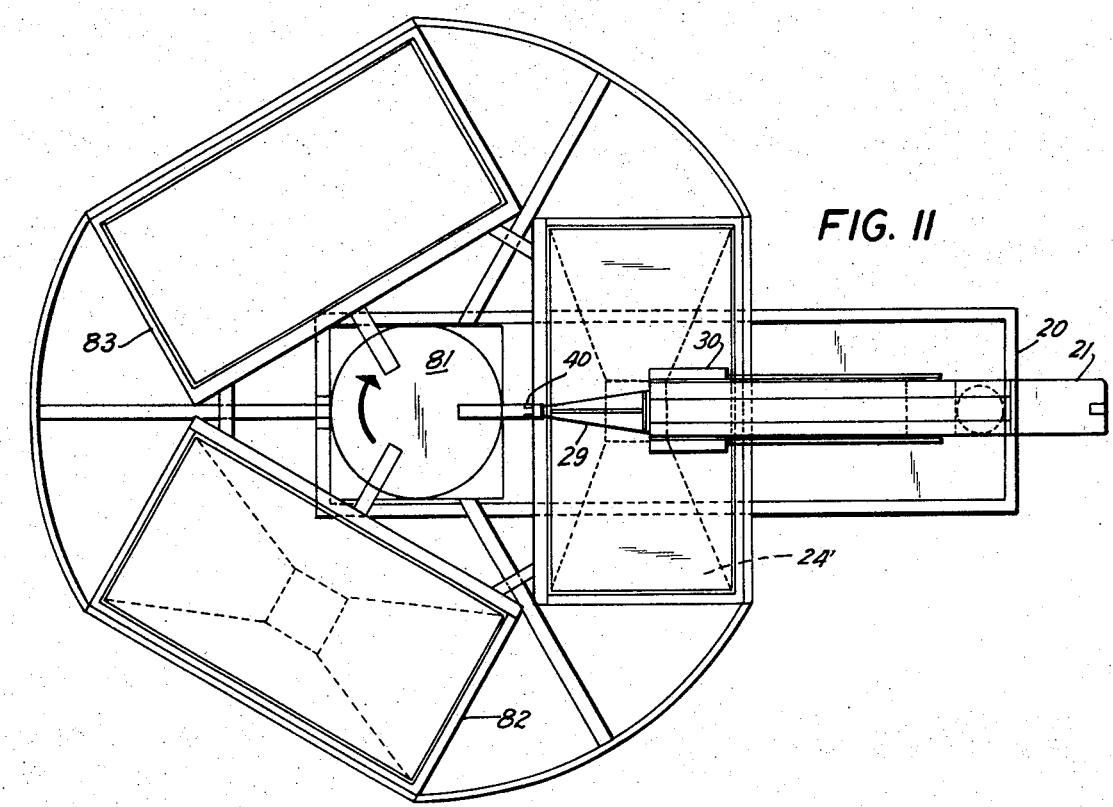

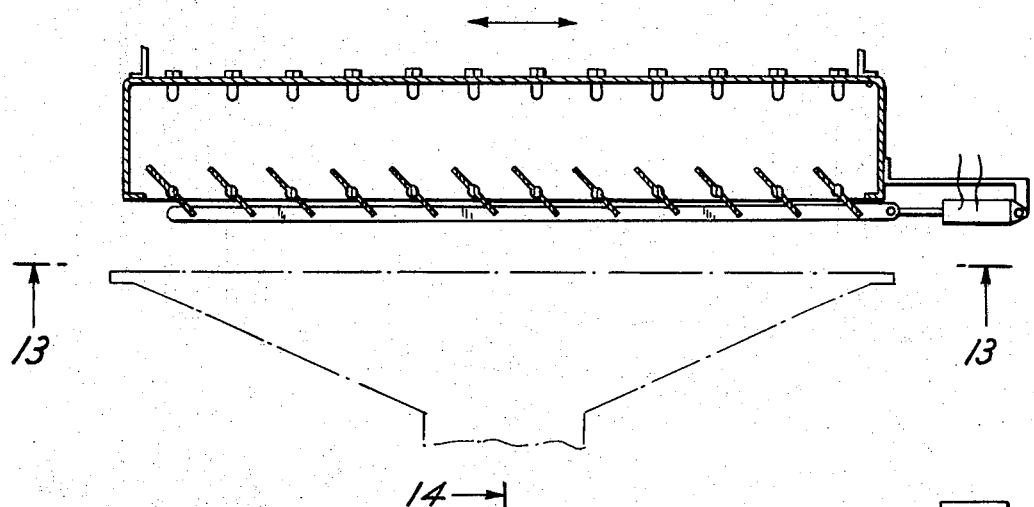
FIG. 12
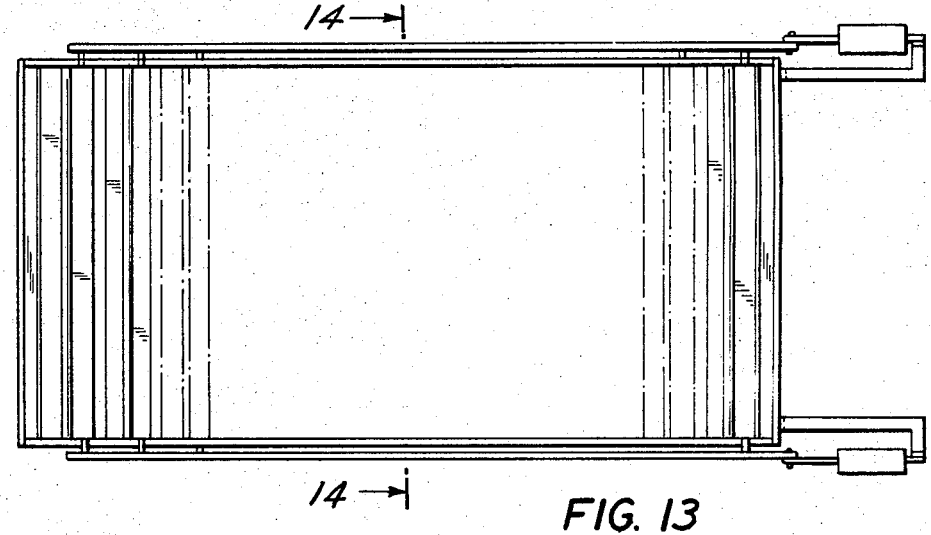
FIG. 13
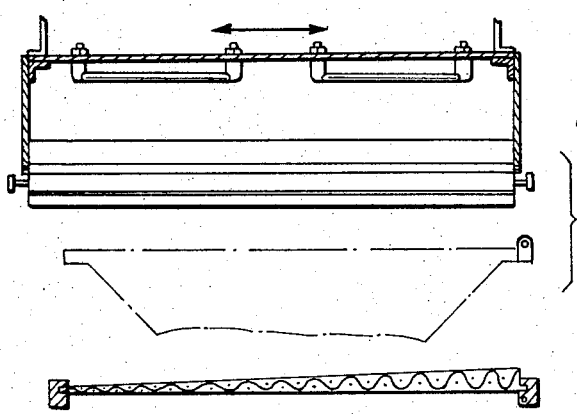
FIG. 14
FIG. 15
INVENTOR
GIACOMO BIANCHINI
BY
ATTORNEYS

United States Patent Office 3,701,709
Patented Oct. 31, 1972

3,701,709
METHOD AND MEANS FOR HEAT BONDING
Giacomo Bianchini, Bollate Milan, Italy, assignor to
DHJ Industries, Inc., New York, N.Y.
Filed Apr. 9, 1970, Ser. No. 26,851
Int. Cl. B30b 15/34; B29c 19/02
U.S. Cl. 156—583                    5 Claims

ABSTRACT OF THE DISCLOSURE

A method and means for heat bonding materials together utilizing two spaced cooperating plates wherein the first of said plates supports the material to be bonded and through which a vacuum is applied and the second of said plates supports a heat source and there is relative movement of said plates substantially parallel to one another.

BACKGROUND OF THE INVENTION

The present invention relates to the bonding of materials together through the use of heat, frequently referred to as heat bonding or fusing and especially such heat bonding or fusing through the use of heat in the infrared heat range.

More particularly, the invention relates to a method and means to permit the preparation of ready-made garments generally, and specifically the preparation of products requiring the combination of one fabric with another or combining a plurality of fabrics.

Such combination is preferably accomplished by disposition between or on the fabric or fabrics of suitable bonding agents, eliminating the laborious operations of repeated sewing or stitching.

The operation of combining has generally been accomplished by use of ironing presses which require specific technological and functional characteristics to ensure uniform quality of results. In general practice, the plate and counterplate of such an ironing press must be able to exert very high pressures and reach temperatures as high as 180° C. and this uniformly throughout the area of contact, since even minute differences of pressure and/or temperature would cause visible and other deficiencies and defects in the results of combination, as the binder might be softened or stiffened unduly.

SUMMARY OF THE INVENTION

The present method of manufacture and operation provides the possibility of combining fabrics and shaping at the same time by the use of an improved device consisting essentially of two spaced plates on one of which the fabrics to be fused and/or formed are placed and made to adhere by virtue of the action of air, controlled by suitable pumps, while the fusing and/or shaping is stabilized by the action of suitable heaters.

More specifically, the subject method provides that in the improved device to be used as a fusing device, the bottom plate is replaced by a supporting member, such member being made of material not deformed by heat and having suitable areas provided with suitable orifices of very small diameter.

The said supporting memebr on which the fabrics are to be placed is connected below with an aspirator capable of setting up suction inside the support causing the fabrics to adhere thereto.

According to the present method there is provided a plurality of heating elements, preferably employing infrared rays, intended to bring about fusion. The heating elements are interposed and turned downward. Provision is made to inflict oscillatory movement on the upper plate in a plane substantially parallel to the lower plate to ensure the uniform bonding. The heat and oscillation results in uniform heating on the fabric.

Thus with the subject invention the fusing is accomplished without pressure. Adhesives cannot stick to the machine head. There is no strike through or strike back. There is substantially uniform fusing without crushing or weakening of fibers, the complete melting of powders together with vacuum pulling gives good overall coverage of fibers by adhesive in the desired areas.

The creation of the vacuum may be controlled by means of pedals or push-buttons to be actuated by the operator as also the operating cycle of the heating elements, the oscillation and the opening and closing motions of the plates. Means are provided for accomplishing these mechanical operations.

DESCRIPTION OF THE DRAWINGS

In the accompanying drawings:
FIG. 10 is a side elevation of a bonding device constructed in accordance with the teachings of this invention wherein a three-position platform is utilized;
FIG. 11 is a plan view of the device shown in FIG. 10;
FIG. 12 is a partially sectional front view of an alternate form of heat tray with the lower member shown diagrammatically in broken lines;
FIG. 13 is a sectional view taken along the line 13—13 in the direction of the arrows in FIG. 12 providing a view from below of the heat tray;
FIG. 14 is a sectional view taken along the line 14—14 in the direction of the arrows in FIG. 13;
and
FIG. 15 is an alternate embodiment of the protective screen.

DESCRIPTION OF THE PREFERRED EMBODIMENTS

Figure 1:
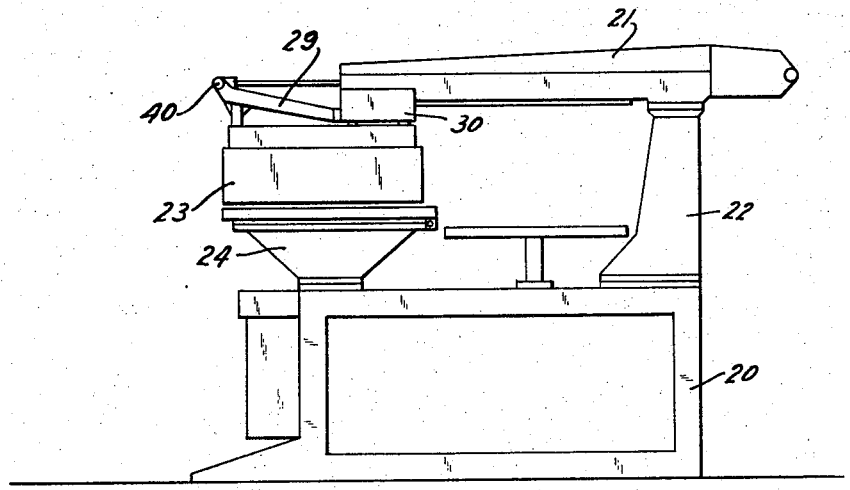
FIG. 1 is a side elevation of a machine constructed in accordance with the teachings of this invention, with the plates shown in bonding position.

The machine, as shown in FIGS. 1 through 9, includes base portion 20, horizontal upper housing 21 supported on the base portion by vertical support housing 22, heat tray 23 and vacuum member 24.

Figure 5:
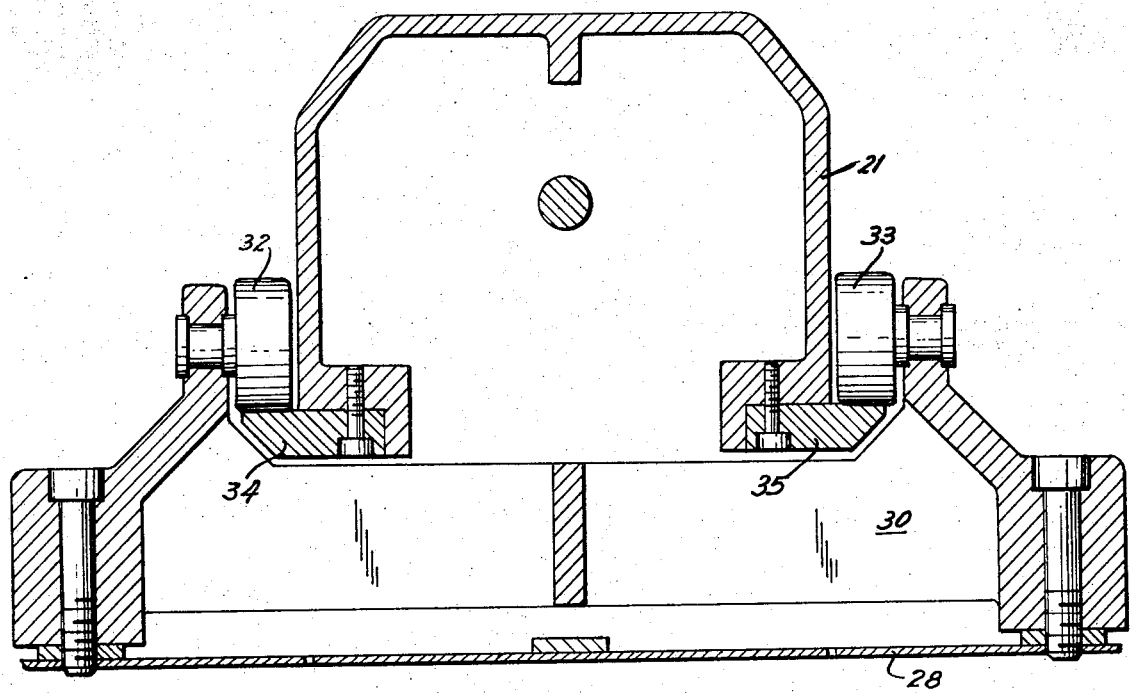
FIG. 5 is a sectional view taken along the line 5—5 in the direction of the arrows in FIG. 4 illustrating the manner in which the upper plate is supported for movement between the bonding position shown in full lines in FIG. 4 and the loading position shown in broken lines in FIG. 4.
Figure 4:
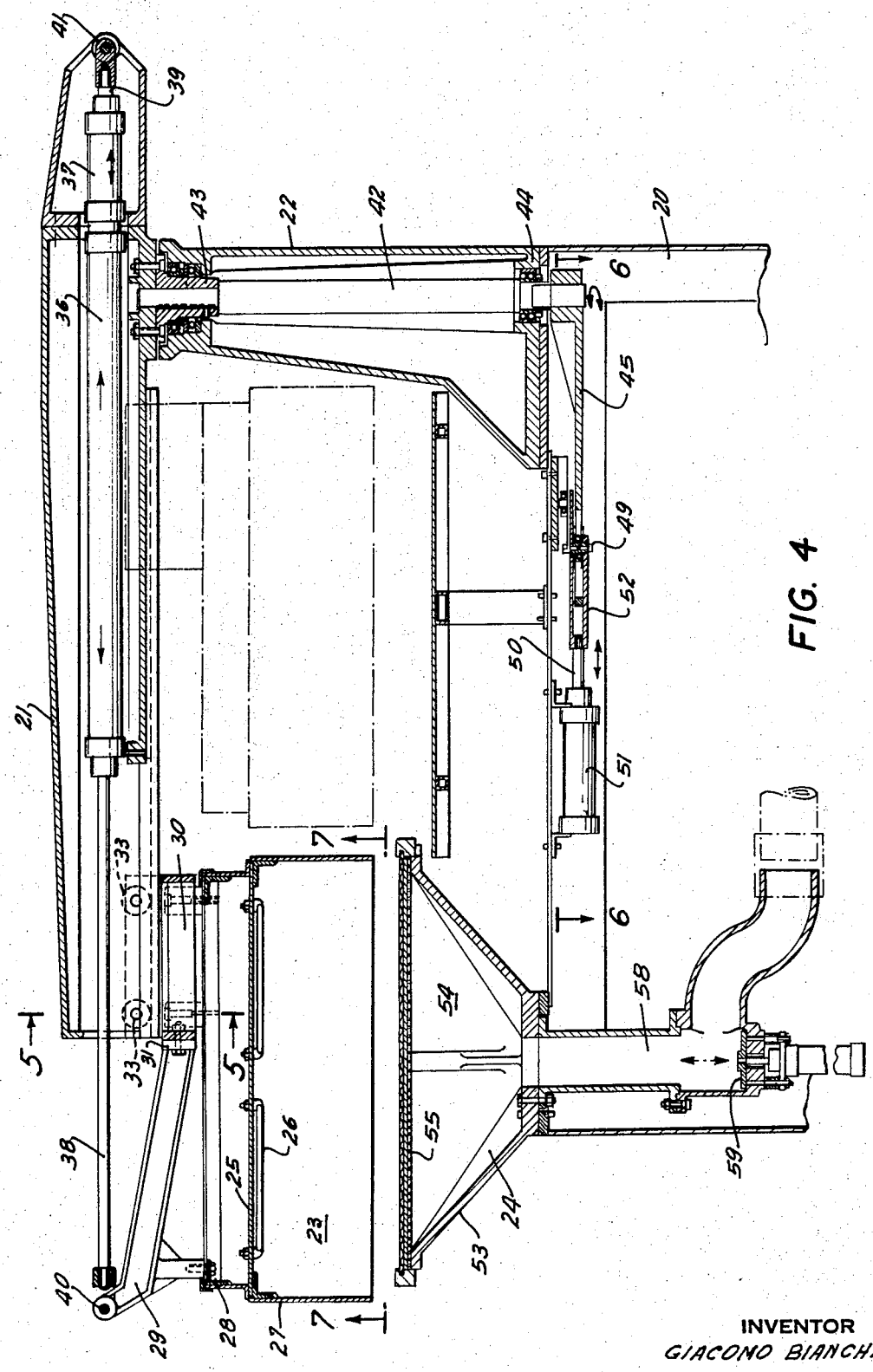
FIG. 4 is a sectional view taken along the line 4—4 in the direction of the arrows in FIG. 3 illustrating related parts of the machine.
Figure 6:
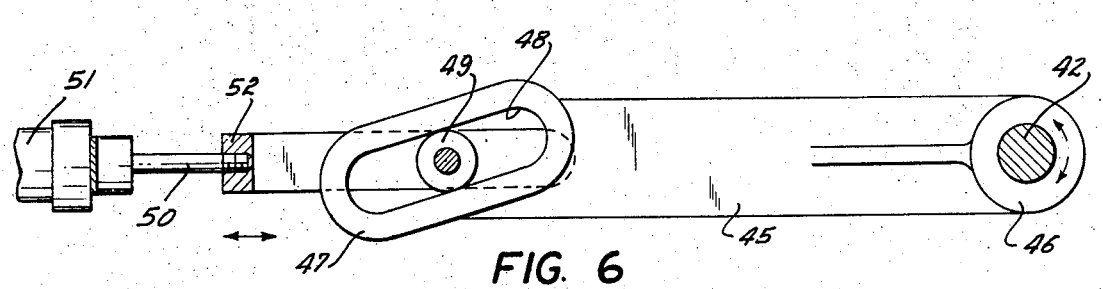
FIG. 6 is a sectional ivew taken along the line 6—6 in the direction of the arrows in FIG. 4 illustrating a portion of the structure utilized for accomplishing the oscillatory motion of the upper plate with respect to the lower plate.
Figure 7:
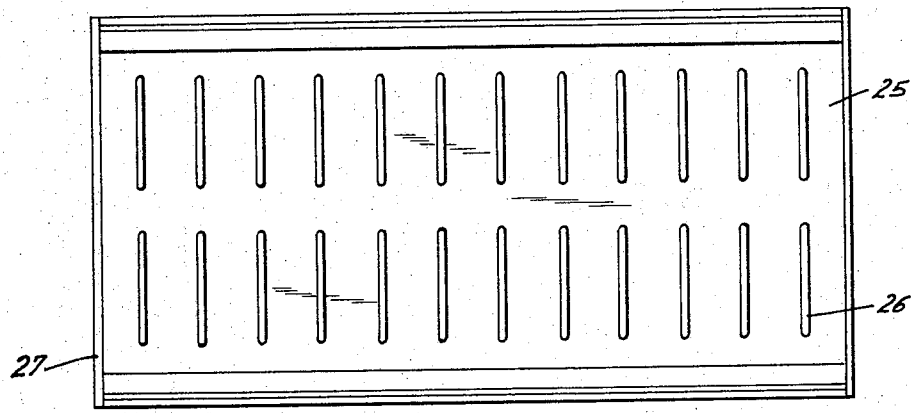
FIG. 7 is a sectional view taken along the line 7—7 in the direction of the arrows in FIG. 4 illustrating the lamps mounted in the upper plate.
Figure 9:
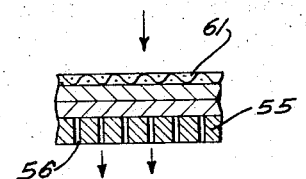
FIG. 9 is a fragmentary view of the lower plate and products to be bonded supported thereon.

The heat tray 23 consists of lamp support plate or back 25, lamps 26 supported thereby and downwardly directed peripheral skirt 27. A bracket 28 is mounted on top of back 25, to which is attached brackets 29 and 30 as seen best in FIGS. 4 and 5. Brackets 29 and 30 are rigidly fastened at 31 and bracket 30 supports two pair of wheels 32 and 33, the two wheels of pair 33 being seen in FIG. 4 while one wheel of each pair is seen in FIG. 5. Each pair of wheels is constructed to ride on a track projecting from upper housing 21 substantially throughout its length to allow movement of the upper plate between the positions shown in FIGS. 1 and 2. Thus, wheels 32 are shown in FIG. 5 riding on track 34 and wheels 33 are shown in FIG. 5 riding on track 35.

Two pneumatic cylinders 36 and 37 are supported in housing 21 with cylinder rod 38 projecting from and controlled by cylinder 36 and cylinder rod 39 controlled by cylinder 37 projecting from cylinder 37. The projecting end of rod 38 is pivotally connected to bracket 29 and the projecting end of rod 29 is pivotally connected to the closed end of housing 21. The respective connections are indicated by the numerals 40 and 41.

In the operation of the device as will be seen below, the pneumatic cylinder 36 and its associated rod 38 are utilized to move the upper plate or heat tray 23 between the positions shown in FIGS. 1 and 2 while the cylinder 37 and its associated rod 39 are utilized to provide a slight oscillatory movement of the upper plate or member 23 with respect to the lower plate or member 24 when the upper plate 24 is in the bonding position shown in FIG. 1.

As mentioned above, the upper housing 21 is supported above base portion 20 by vertical support 22. The support is provided by shaft 42 mounted vertically within housing 22 by upper and lower bearings 43 and 44 respectively. The upper end of shaft 42 is rigidly connected to the upper housing 21 so that rotary motion of shaft 42 will result in rotary motion of upper housing 21. The lower end of shaft 42 projects within the base portion 20 and is rigidly attached to bracket 45 therein. Bracket 45 is seen best in FIG. 6 which is a sectional view taken along the line 6—6 in the direction of the arrows in FIG. 4. The bracket 45 is formed with a cylindrical end portion 46 within which the end of shaft 42 is journaled and an elliptical end portion 47 providing a channel 48 having an axis forming an angle with the axis of the bracket 45 within which pin 49 projects. The pin 49 is attached to cylinder rod 50 of pneumatic cylinder 51 by connector 52. Thus, movement of rod 50 back and forth in the direction of the arrows results in movement of pin 49 and rotational movement of bracket 45 and shaft 42 with the axis of shaft 42 being the center of rotation. Back and forth movement of cylinder rod 50 therefore will result in circular oscillatory movement of upper housing 21 about the axis of shaft 42, the movement being transmitted through bracket 45 and shaft 42.

The lower plate or member 24 which is supported by base portion 20 has sides 53 forming a chamber 54 closed at the top by member 55 having orifices 56 of small diameter and communicating with vacuum pump 57 through duct 58 to create a pressure differential across products on plate 24. A piston 59 is provided within duct 58 to open and close the vacuum at predetermined desired intervals.

Frame 60 supporting Teflon screen 61 is connected to the member 24 at hinged connection 62. This provides a protective covering for the products being bonded. Any suitable material can be used for this purpose.

Figure 2:
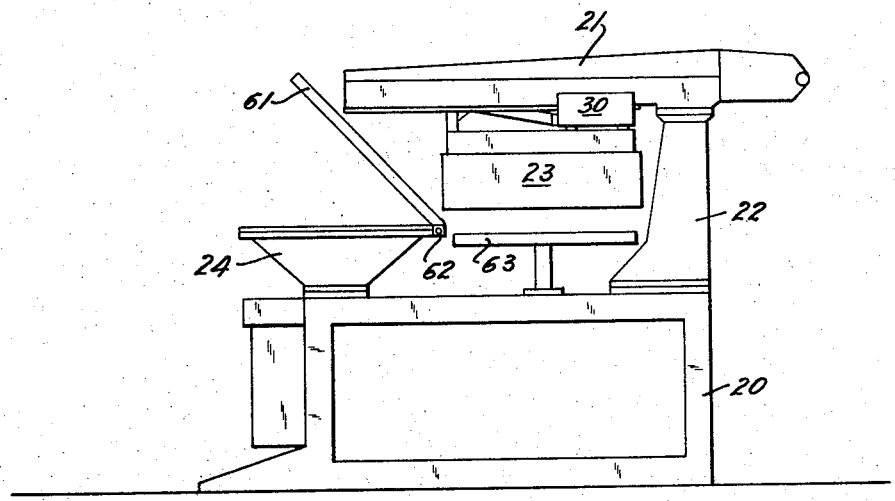
FIG. 2 is a view similar to that of FIG. 1 with the upper plate retracted and the lower plate or table shown ready for loading or unloading.
Figure 3:
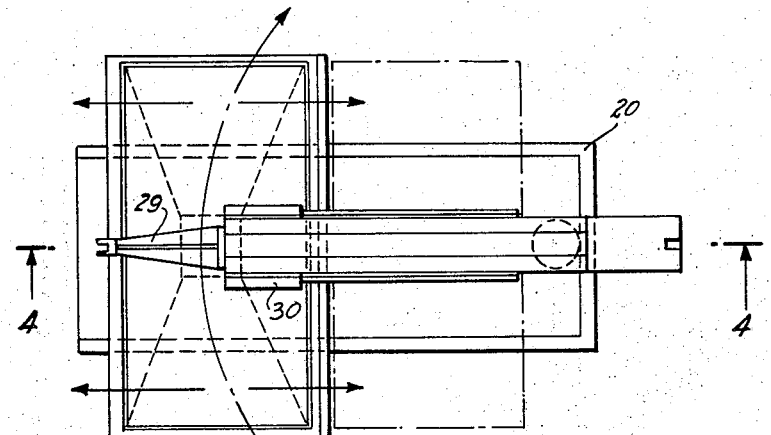
FIG. 3 is a plan view of the machine shown in FIGS. 1 and 2 with the machine position of FIG. 1 shown in full lines and the machine position of FIG. 2 shown in broken lines and the compound oscillatory movement of the upper plate with respect to the lower plate indicated by the arrows.

Also supported on base portion 20 is a platform 63 coated with a material which reflects heat back into the upper plate 23 when the upper plate is in the position shown in FIG. 2 and over platform 63.

Figure 8:
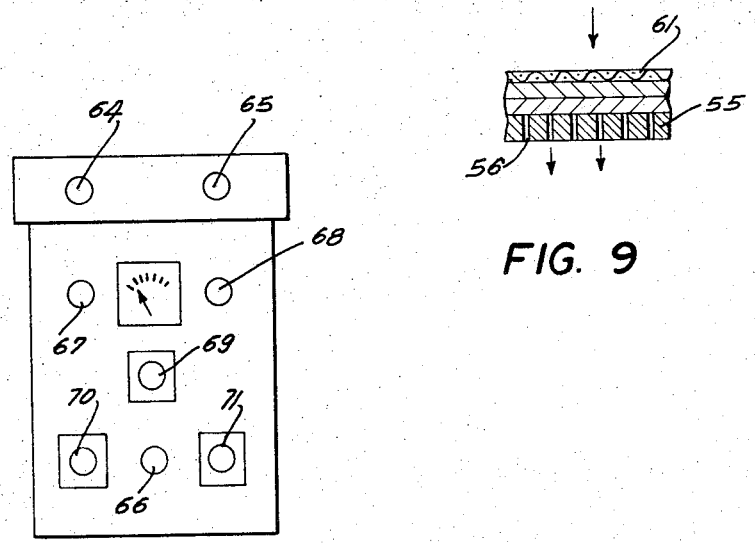
FIG. 8 is a face view of the control panel of the machine.

A typical control panel for the device is shown in FIG. 8 wherein the numerals 64 and 65, respectively, designate the start and stop buttons. An on-off light 66 is shown and a light 67 indicating the heat on and light 68 indicating the vacuum in operation. A timer 69 is provided as are a vacuum timer when the vacuum is in operation, and the upper plate in bonding position as shown in FIG. 1 is illustrated by the numeral 70, and a vacuum timer when the upper plate is in the position shown in FIG. 2 is provided and indicated by the numeral 71.

In order to bond materials through the use of the device, the materials to be bonded are placed between screen 61 and member 55 when the heat tray 23 is in the position shown in FIG. 2. The lamps can be on. The heat tray 23 is moved by pneumatic cylinder 36 into the position shown in FIG. 1 wherein pneumatic cylinders 37 and 51 cooperate respectively to move the upper plate in a back and forth and rotary motion to produce the compound motion illustrated in FIG. 3. While this is occurring, the vacuum is being drawn through orifices 56 in plate 55. After sufficient time has passed to provide for the bonding, the upper plate 23 is moved by the action of cylinder 36 to the position again shown in FIG. 2 and frames 60 and 61 separated and the bonded products removed. The operation can then be repeated.

With the structure described thus far, a method and means for heat bonding materials together has been provided wherein the lower plate or member supports the material to be bonded and the heat tray or upper member is moved in an oscillatory motion in a plane substantially parallel to the lower member. One means for accomplishing this oscillatory movement has been shown and described. The invention, however, contemplates in its broad aspects any particular means of achieving such motion, such as, for example, utilization of a cylinder, such as cylinder 51 attached directly to the horizontal upper housing 21.

In FIGS. 10 and 11 there is shown an alternate embodiment of the invention wherein a machine of the type previously described is utilized in cooperation with a three-position platform providing for loading, unloading and bonding positions as seen in FIG. 11. As illustrated in FIGS. 10 and 11, the parts shown therein which are identical to parts previously described, have been given numerals followed by a prime, which numerals are the same as the numerals given to like parts in the previous figures. Additionally, however, there is provided a turntable generally indicated by the numeral 80. The central portion 81 of the turntable provides means for rotating the three frame members 82, 83 and 84, each of which provides a protective coating similar to that provided in the previous embodiment. One position of the turntable is shown in FIG. 11 wherein the frame 82 is in the unload position whereat products already bonded are to be removed and frame 83 is in the load position whereat products to be bonded are being loaded. The frame 84 is in the bond position. In the embodiment of FIG. 10 after suitable time has been allowed to pass, the platform will be rotated so that the frame 84 is in the unload position, frame 82 is in the load position and frame 83 in the bond position.

The vacuum for bonding in the bond position 84 is created within chamber 24'.

In an alternate form of the invention with the embodiment of FIGS. 10 and 11 the heat tray 23 can be held stationary and the materials to be bonded rotated into position by the carrousel. The machine is indexed, that is, the carrousel rotates the materials to be bonded from one position to the next wherein the work is accomplished. An additional vacuum chamber can be added in the unload position to increase the speed of operation of the device.

It is desirable with all embodiments of the invention to obtain even exposure to the heat rays over the entire fusing area. With movements of the heat tray and in the embodiment utilizing the carrousel with stationary heat tray, it has been found desirable to utilize the heat tray structure shown in FIGS. 12 through 14 wherein a system of shutters or louvers 90 operated by cylinder 92 and rod 93 is placed on the heat tray 94 to modify or control the heat rays from lamps 95 as these heat rays approach the fusing area. It is anticipated that the oscillation will be as indicated—left to right in FIG. 12 for the full width of one shutter.

Provided that this rate of travel is kept constant, the amount of heating applied to the fusing object, and therefore the ultimate temperature, can be accurately controlled by the extent of the shutter opening.

An alternative would be to have the heat tray emitting full rays but to either the fusing area or the heat tray to compensate for the required movement to place the fusing area in position under the heat tray.

A further alternative would be to cover the fusing area with a protective screen of graduated thickness, as shown in FIG. 15, or to be coated in such a way as to form a graduated coating to compensate for the movement.

I claim:

1. A machine for heat bonding materials including in combination an infrared heat tray, a support member for supporting said materials in spaced relation to said heat tray, a support surface of said support member upon which materials to be bonded can be placed, a plurality of orifices formed in said support surface, means for drawing a vacuum through said orifices, means for effecting relative to-and-fro movement of said heat tray with respect to said support surface in a plane maintaining said spaced relation constant and in which said heat tray is supported above said support member by an upper housing, and the means for effecting relative movement of said heat tray consists of pneumatic piston means.

2. A machine for heat bonding materials in accordance with claim 1 in which said pneumatic piston means includes a first piston for effecting oscillatory straight light movement of said heat tray with respect to said support member and a second piston for effecting oscillatory arcuate movement of said heat tray with respect to said support member.

3. A machine for heat bonding materials including in combination a heat emitting member, a carrousel, a plurality of support surfaces provided upon said carrousel, means for indexing said carrousel in movement to selectively place one of said support members beneath said heat tray and vacuum means provided beneath said heat tray for drawing a vacuum across the support surface beneath said heat tray.

4. A machine for heat bonding materials in accordance with claim 3 in which second vacuum means are provided for additionally drawing a vacuum across the support surface in the position immediately following removal from beneath said heat tray.

5. A machine for heat bonding materials including in combination a heat emitting member, a support member for supporting said materials in spaced relation to said heat emitting member, and means for effecting relative to-and-fro movement of said heat emitting member and said support member while retaining said spaced relation constant and in which louvers are provided between the materials to be bonded and said heat emitting member for controlling heat applied thereby to the materials to be bonded, and means for adjusting the opening of said louvers.

References Cited

UNITED STATES PATENTS

| 3,255,843 | 6/1966 | MacDonald | 156—285 X |
| 3,477,194 | 11/1969 | Corrsin | 156—272 X |
| 3,149,018 | 9/1964 | Jacobson | 156—272 X |

BENJAMIN A. BORCHELT, Primary Examiner

J. M. HANLEY, Assistant Examiner

U.S. Cl. X.R.

156—380